US005217353A

United States Patent [19]

De Filippis

[11] Patent Number: 5,217,353

[45] Date of Patent: Jun. 8, 1993

[54] FAN, PARTICULARLY FOR MOTOR VEHICLES

[75] Inventor: Pietro De Filippis, Milan, Italy

[73] Assignee: Industrie Magneti Marelli SPA, Milan, Italy

[21] Appl. No.: 780,638

[22] Filed: Oct. 23, 1991

[30] Foreign Application Priority Data

Oct. 30, 1990 [IT] Italy ............................ 67849 A/90

[51] Int. Cl.[5] ............................ F04B 17/00

[52] U.S. Cl. ............................ 417/368; 417/354; 417/423.14; 417/423.7

[58] Field of Search ............................ 416/169 A; 417/354, 417/368, 369, 370, 423.14, 423.7

[56] References Cited

U.S. PATENT DOCUMENTS 1,230,206 6/1917 Niemeyer ............ 417/423.14
1,779,657 10/1930 Breidert ............ 417/368 X
2,709,035 5/1955 Schmidt ............ 417/368 X
2,871,791 2/1959 Litzenberg ............ 417/370 X
2,956,731 10/1960 Bayuk et al. ............ 417/423.14
3,263,908 8/1966 Kroker et al. ............ 417/368
3,341,113 9/1967 Sebok et al. ............ 417/368
3,698,839 10/1972 Distefano ............ 417/368 X
3,933,416 1/1976 Donelian ............ 417/423.7 X
4,428,719 1/1984 Hayashibara et al. ............ 417/354
4,476,405 10/1984 Komurasaki ............ 416/169 A X
4,527,960 7/1985 DeSisto ............ 417/368

FOREIGN PATENT DOCUMENTS 345796 6/1989 European Pat. Off. .
2742962 4/1979 Fed. Rep. of Germany .
3917040 12/1989 Fed. Rep. of Germany .
604385 3/1960 Italy ............ 417/370

*Primary Examiner*—Edward K. Look
*Assistant Examiner*—Todd Mattingly

[57] ABSTRACT

The fan includes a bladed, centrifugal fan wheel and an electric motor with an external rotor which is foxed torsionally to the fan wheel. The motor includes a casing constituted by a stationary part with holes for taking in air from outside for ventilating the interior of the motor and a rotary part with holes which act as outlet ducts for the internal ventilation air. The cross-sections of the ducts decrease in the direction of the air-flow and open into the outside atmosphere in regions over which the air-flow induced by the fan wheel passes in operation.

5 Claims, 3 Drawing Sheets 5
10
9c
11
13
21
22
18
19
20
3
4
II
12
9a
9b
8
23
10
3a
7
9
6
9b
16
9c
F
13
11
2
1
III

FAN, PARTICULARLY FOR MOTOR VEHICLES

BACKGROUND OF THE INVENTION

The present invention relates to a fan particularly for use in motor vehicles.

More specifically, the invention relates to a fan of the centrifugal type, which fan is adapted to be driven by a brushless electric motor.

SUMMARY OF INVENTION

In accordance with the present invention a centrifugal fan is mounted adjacent to and driven by an electric drive motor with an external rotor which is fixed torsionally to the fan wheel, the motor including a casing comprising a stationary part with at least one hole for taking in air from the outside atmosphere for ventilating the interior of the motor and a rotary part with at least one hole which acts as an outlet for the internal ventilation air.

The fan according to the invention is characterised in that the at least one hole in the rotary part of the casing of the motor is constituted by a duct whose cross-section decreases in the direction in which the internal ventilation air flows out, and in that the duct is formed so as to open into the outside atmosphere in a region over which the air-flow induced by the fan wheel passes in operation.

This characteristic improves the extraction of the air from the interior of the electric drive motor and hence improves the internal ventilation of the motor.

Further characteristics and advantages of the fan according to the invention will become clear from the detailed description which follows with reference to the appended drawings, provided purely by way of non-limiting example.

DETAILED DESCRIPTION

Figure 1:
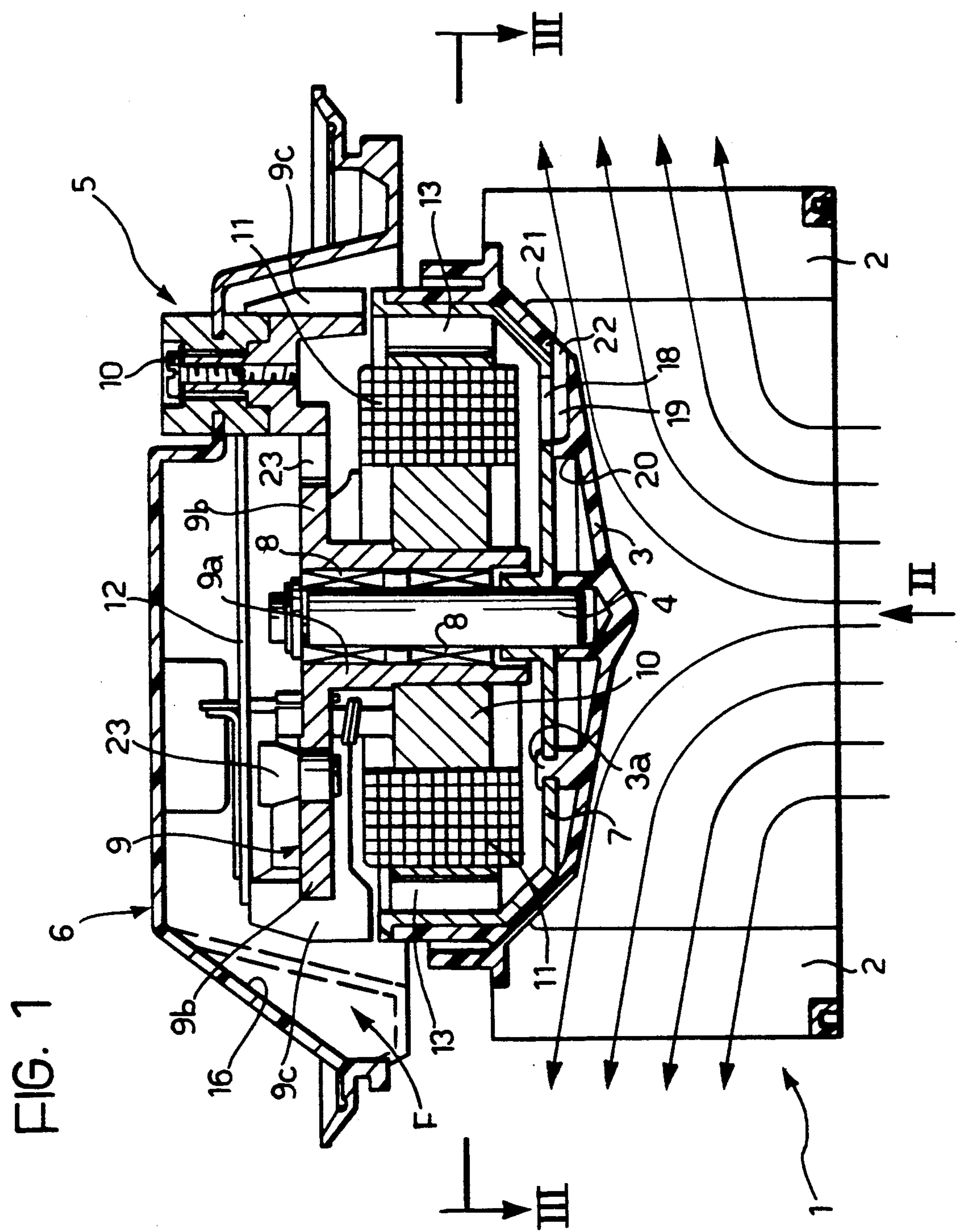
FIG. 1 is an axial section of a fan according to the invention.

With reference to the drawings, a fan according to the invention includes a bladed, centrifugal fan wheel 1 with a circular array of frontal blades 2 fixed integrally to a cup-shaped hub 3 (FIG. 1). The fan wheel 1 may conveniently be moulded from plastics material.

The fan wheel is keyed to the shaft 4 of an electric drive motor generally indicated 5. In the embodiment shown by way of example, the motor is a brushless motor with an external rotor. The motor includes a casing constituted by a stationary part 6, for example, also moulded from plastics material, and a metal shell 7, for example, of iron. The shell, which is also substantially cup-shaped, is fixed torsionally to the hub 3 of the bladed fan wheel 1. In the embodiment shown, this is achieved by the upsetting of the ends of integral internal projections 3*a* of the hub 3 which extend through holes provided for the purpose in the shell 7 (FIG. 1).

The unit constituted by the shell 7 and the bladed fan wheel 1 is keyed to one end of the shaft 4 of the electric motor, the shaft being rotatable in bearings 8 mounted in a central tubular portion 9*a* of a shaped support member 9, for example, of aluminium, fixed to the stationary cover 6 by screws 6*a*.

The stator structure of the electric motor, comprising a pack of plates 10 carrying the stator windings 11, is fixed around the tubular portion 9*a* of the support member 9.

A support plate 12 is mounted between a flange portion 9*b* of the support member 9 and the stationary outer cover 6 (FIG. 1) and carries the components of an electronic circuit for controlling the motor.

The flange portion 9*b* of the support member 9 has a plurality of cooling fins, indicated 9*c*.

Figure 3:
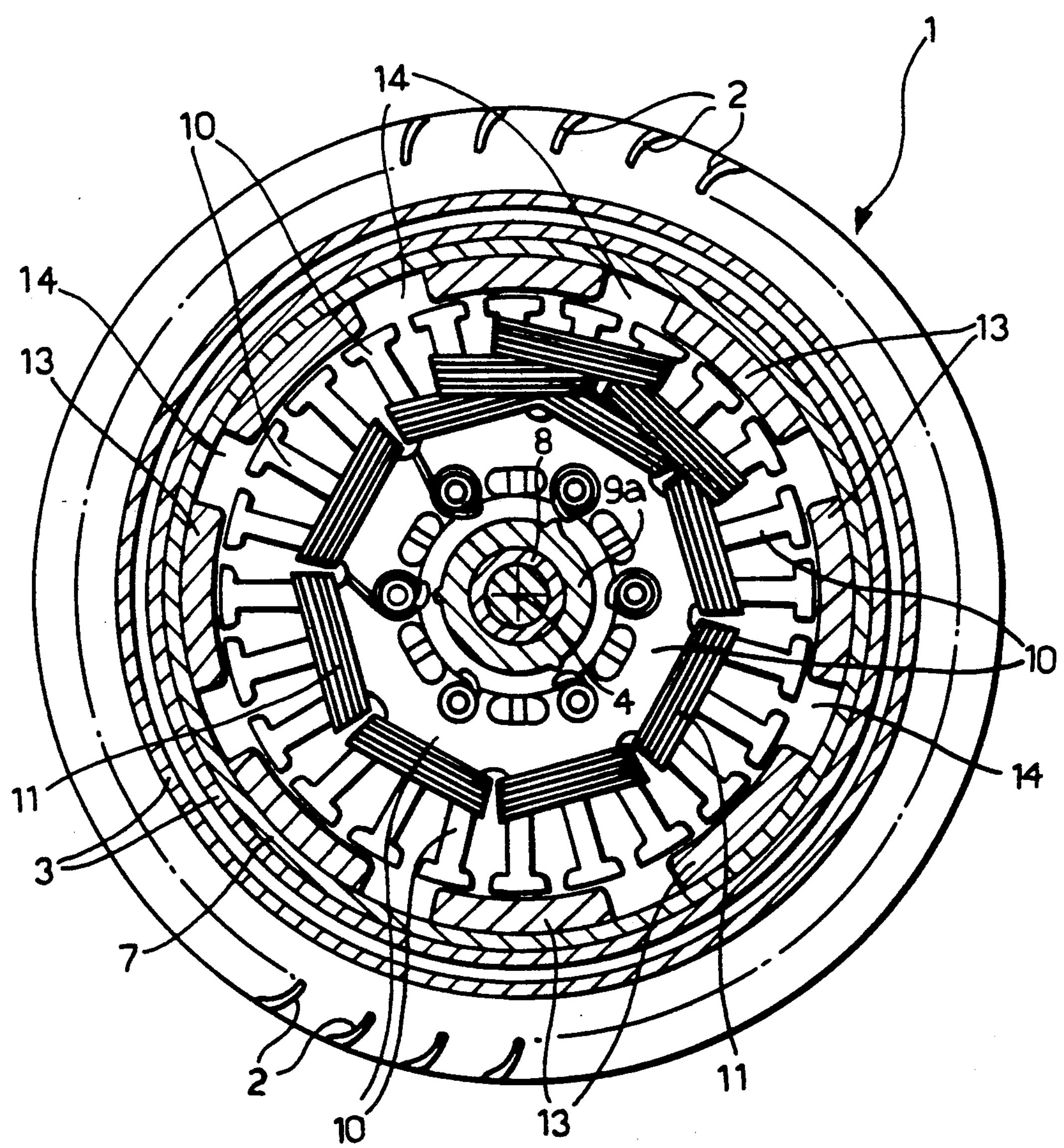
FIG. 3 is a cross-section of the driven fan taken on the line III—III of FIG. 1.

The shell 7 houses angularly-spaced permanent magnets, indicated 13 in FIGS. 1 and 3. As can be seen in particular in FIG. 3, the permanent magnets are spaced equiangularly and a space or gap, indicated 14, is defined between each pair of magnets.

The permanent magnets 13 are disposed around the stator structure of the electric motor, as can be seen particularly in FIG. 1.

A hole (indicated 16 in FIG. 1) is defined in the stationary part 6 of the casing of the electric motor 5 for taking in air from the outside atmosphere (in the direction of the arrow F in FIG. 1) for ventilating interior of the electric motor 5. As indicated by the arrow F ambient air enters an opening in the casing 6 which air passes around the interior of the casing 6 through the triangular duct or space illustrated in FIG. 1, it being noted that the exterior wall defining the outer edge of the opening 16 is oriented at a greater distance from the axis of rotation of the blower and its shaft than is the corresponding wall on the opposite side of the casing 6 so as to define a tapered or convergent duct.

Figure 2:
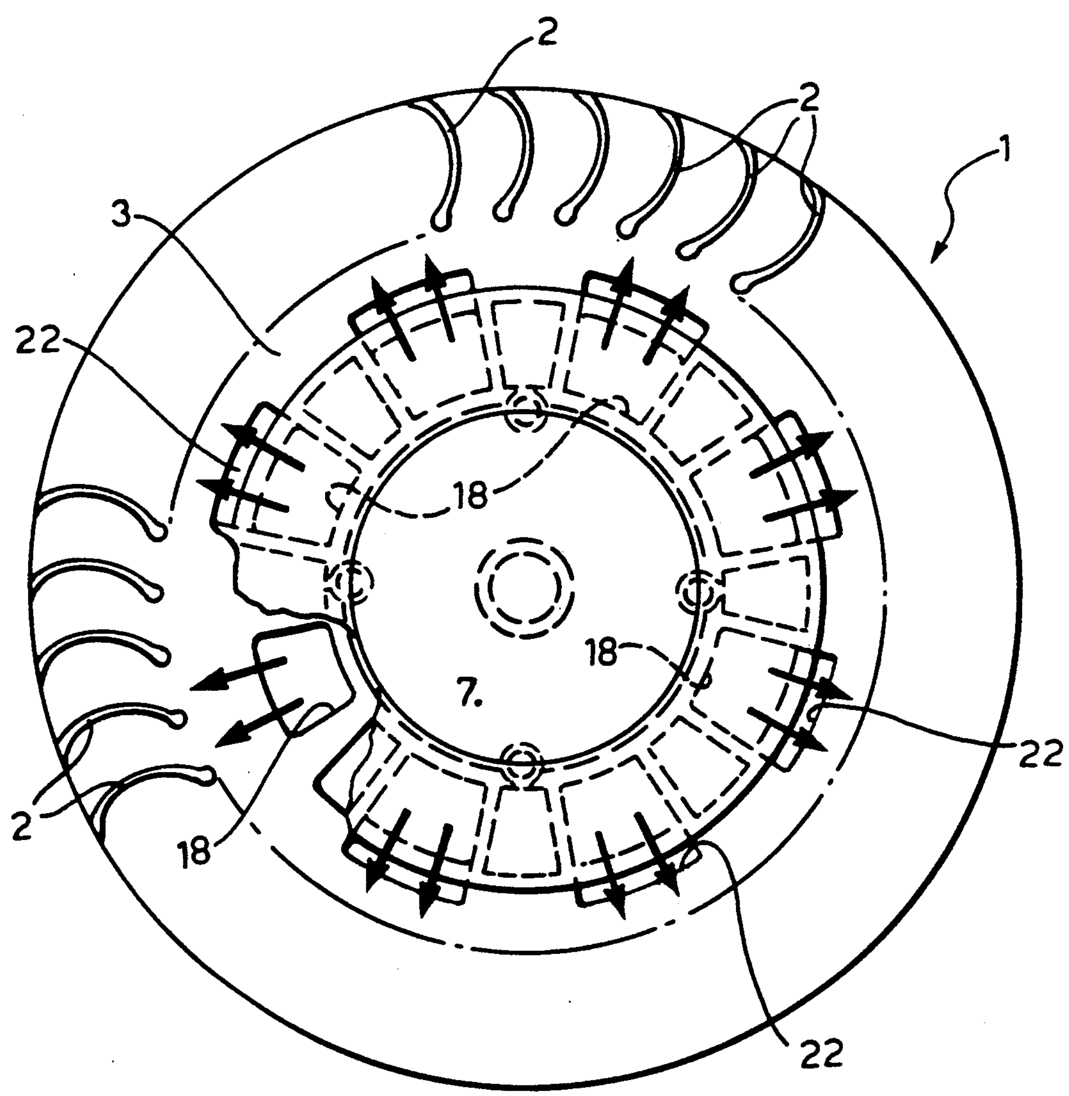
FIG. 2 is a front view of the fan taken on the arrow II of FIG. 1.

In the embodiment shown by way of example, the shell 7 of the motor has a plurality of equiangularly-spaced holes 18 (FIGS. 1 and 2). These holes face corresponding radial channels 19 (FIG. 1) defined in the concave face of the hub 3 of the fan wheel between an annular projection 20 of the hub and a radially outermost part 21 of the hub facing the blades. The channels 19 open to the outside through holes 22 in the hub.

As can be seen in FIG. 2, the holes 18 in the shell 7 of the motor, the channels 19 and the holes 22 in the hub of the fan wheel together define a series of outlet ducts for the air which ventilates the interior of the motor. Conveniently, as can be seen in particular in FIG. 1, these outlet ducts are formed so that their cross-sections decrease in the direction in which the internal ventilation air flows out so as to achieve a kind of Venturi effect.

As can be seen particularly in FIG. 1, the holes 22 through which the internal ventilation air can flow are formed in a region of the hub 3 of the fan wheel over which the centrifugal air-flow induced by the fan wheel flows in operation.

Within the electric motor 5, the air drawn in through the intake hole 16 in operation flows over the components of the control circuit carried by the plate 12 and the flange portion 9*a* of the support structure 9 and then reaches the pack of stator plates 10, the windings 11, and the permanent magnets 13, passing through holes 23 in the flange portion 9*a* of the support structure 9.

Some of the air for ventilating the interior of the motor flows through the spaces 14 between adjacent pairs of permanent magnets 13. Conveniently, the holes 18 in the half-shell 7 and the channels 19 in the hub 3 of the fan wheel are formed in angular positions corresponding to those of the spaces 14 between the magnets.

In operation, the ventilation of the interior of the electric motor 5 is particularly effective because of the extraction effect induced both by the shapes of the air-outlet ducts 18-22 and by the suction effect induced by the air-flow generated by the fan 2, which produces fast-flowing streams of fluid over the outlet holes 22.

Naturally, the principle of the invention remaining the same, the forms of embodiment and details of construction may be varied widely with respect to those described and illustrated purely by way of non-limiting example, without thereby departing from the scope of the present invention.

The shapes and arrangement of the outlet ducts for the internal ventilation air give very good results not only in a brushless motor, as in the embodiment described above, but also in general in the direct-current motors with commutators conventionally used in motor vehicle fans.

I claim:

1. A fan, particularly for motor vehicles, comprising:

a bladed, centrifugal fan wheel, and an electric drive motor with an external rotor which is fixed torsionally to the fan wheel, the motor including a casing comprising a stationary part with at least one hole for taking in air from the outside atmosphere for ventilating the interior of the motor and a rotary part with at least one hole which acts as an outlet duct for the internal ventilation air, the said at least one hole in the rotary part of the casing of the motor communicating with a casing defined duct whose cross-section decreases in the direction in which the internal ventilation air flows, said motor casing including a rotating part defining an exit opening for said duct, said fan wheel having a hub with at least one opening for communicating with said duct outlet whereby ventilation air is exhausted in a region over which the air-flow induced by the fan wheel passes in operation.

2. A fan according to claim 1, in which the electric motor is of the brushless type and has angularly spaced permanent magnets within the rotary part of the casing of the motor, the permanent magnets being separated by spaces or gaps through which at least some of the air-flow for the internal ventilation of the motor can pass.

3. A fan according to claim 2, wherein the rotary portion of the casing of the motor has a plurality of outlet holes for the internal ventilation air in relative positions corresponding to the relative angular positions of the spaces between the permanent magnets.

4. A fan according to claim 2, wherein the stationary part of the motor includes a plate for supporting the components of a control circuit for the motor, the plate extending transverse the axis of rotation of the motor between the at least one intake hole and the at least one outlet hole for the internal ventilation air.

5. A fan according to claim 4, wherein the stationary part of the electric motor includes a metal support member with a series of cooling fins.

* * * * *